United States Patent

Lebas et al.

[11] Patent Number: 5,948,948
[45] Date of Patent: Sep. 7, 1999

[54] PARAFFIN ISOMERISATION PROCESS USING REACTIVE DISTILLATION

[75] Inventors: Etienne Lebas; Sophie Jullian; Christine Travers, all of Rueil Malmaison; Pierre Capron, Briey; Jean-François Joly, Lyons; Michel Thery, Vernaison, all of France

[73] Assignee: Institut Francais du Petrole, Rueil-Malmaison, France

[21] Appl. No.: 08/795,704

[22] Filed: Feb. 4, 1997

[30] Foreign Application Priority Data

Feb. 5, 1996 [FR] France .................................. 96/01471

[51] Int. Cl.⁶ .............................. C07C 5/13; B01D 3/34
[52] U.S. Cl. ...................... 585/739; 585/734; 585/750; 585/751; 585/664; 585/666; 203/28; 203/29; 203/49; 203/91; 203/DIG. 6
[58] Field of Search ...................... 585/734, 739, 585/750, 751, 664, 666; 203/28, 29, 49, 91, DIG. 6

[56] References Cited

U.S. PATENT DOCUMENTS

| 4,213,847 | 7/1980 | Chen et al. | 208/111 |
| 4,400,576 | 8/1983 | den Otter | 585/739 |
| 4,727,217 | 2/1988 | Travers et al. | 585/750 |
| 4,847,430 | 7/1989 | Quang et al. | 568/697 |
| 5,087,780 | 2/1992 | Arganbright | 585/259 |
| 5,368,691 | 11/1994 | Asselineau et al. | 203/29 |

FOREIGN PATENT DOCUMENTS 0 223 514   5/1987   European Pat. Off. .

*Primary Examiner*—Glenn Caldarola
*Assistant Examiner*—In Suk Bullock
*Attorney, Agent, or Firm*—Millen, White, Zelano & Branigan, P.C.

[57] ABSTRACT

The invention concerns a process for isomerising a feed containing essentially hydrocarbons, preferably paraffins preferably containing 5 and/or 6 carbon atoms per molecule, in which said feed is treated in a distillation zone comprising an exhausting zone and a rectification zone associated with an isomerisation reaction zone, in the presence of an isomerisation catalyst and a gas stream containing hydrogen, characterized in that the reaction zone is at least partially internal to the distillation zone, and wherein the hydrogen-containing gas is fed by a dedicated gas distributor to the bottom of at least one catalytic bed within the isomerization reaction zone.

19 Claims, 2 Drawing Sheets

PARAFFIN ISOMERISATION PROCESS USING REACTIVE DISTILLATION

FIELD OF THE INVENTION

The present invention concerns a novel process for isomerising hydrocarbons, preferably paraffins, and more preferably the major portion being paraffins containing principally 4 to 8, preferably principally 4 to 6 and more preferably principally 5 and/or 6 carbon atoms per molecule, in which at least one distillation zone is used associated with an isomerisation reaction zone, characterized in that the reaction zone is at least partially internal to the distillation zone.

BACKGROUND OF THE INVENTION

Elimination of lead alkyls from automobile gasolines, in particular for the purposes of environmental protection, has meant that processes for the production of branched paraffins, in particular the isomerisation of normal paraffins to branched paraffins, is now gaining importance in the petroleum industry. Isomerisation of n-butane can produce isobutane which can be used in processes for alkylating light olefins with at least one isoparaffin to produce paraffinic cuts containing 5 to 12 carbon atoms per molecule. These cuts have high octane numbers. After dehydrogenation, isobutane can be used in etherification using methanol or ethanol. The ethers obtained (MTBE, ETBE), have high octane numbers and can be incorporated into gasoline fractions (gasoline pool).

The process for the isomerisation of hydrocarbons, preferably paraffins, containing principally 4 to 8, preferably principally 4 to 6 and more preferably principally 5 and/or 6 carbon atoms per molecule, is also a process which produces gasoline stock with high octane numbers which can be directly incorporated into gasoline fractions (pool gasoline).

This latter process has been the subject of numerous studies. Three different types of catalyst have traditionally been used to carry out the isomerisation reaction:

Friedel-Crafts type catalysts such as aluminium chloride, used at low temperatures (about 20° C. to 130° C.);

catalysts based on a metal from group VIII deposited on alumina, generally halogenated alumina, preferably a chlorinated alumina, used at medium temperatures (about 150° C.), for example those described in U.S. Pat. Nos. 2,906,798, 2,993,398, 3,791,960, 4,113,789, 4,149,993, 4,804,803, European patent applications EP-A-0 514 527, EP-A-0 661 095, EP-A-0 661 370 and EP-A-0.750.941;

zeolitic catalysts comprising at least one group VIII metal deposited on a zeolite, used at high temperatures (250° C. and more), for example those described in U.S. Pat. Nos. 4,727,217, 4,789,655, 4,935,578, 4,943,546 and 4,977,121 where the zeolite is a mordenite, and those described in U.S. Pat. Nos. 4,724,007, 4,780,736, 4,891,200, 5,157,198, 5,165,906, 5,277,791 and European patent application EP-A-0 601 924 where the zeolite is omega zeolite. These catalysts lead to slightly smaller octane number gains but which have the advantage of being easier to use and more resistant to poisons; nevertheless, their lower acidity means that they cannot be used for the isomerisation of n-butane.

Current processes for the isomerisation of hydrocarbons, preferably $C_4$–$C_8$ paraffins, use catalysts based on platinum deposited on high activity chlorinated alumina which operate without recycling or with partial recycling, after fractionation of the unconverted n-paraffins, or with total recycling after passage over molecular sieve beds.

Operation without recycling, while simple, lacks efficiency in increasing the octane number. In order to obtain high octane numbers, the low octane number constituents must be recycled after passage either through separating columns (for example a deisohexaniser) or over molecular sieves, in the liquid or vapour phase.

The use of molecular sieves has its disadvantages, among them difficulties with using isomerisation catalysts based on halogenated alumina when it is chlorinated, because of the risks of contamination of the integrated molecular sieves with hydrochloric acid, which difficulties are sometimes overcome by using a chlorine trapping apparatus between the isomerisation zone and the adsorption zone when possible. Techniques using molecular sieves have been developed which operate in the presence of the isomerisation reactor containing catalysts based on chlorinated alumina impregnated with platinum. As an example, a non integrated system can be envisaged which employs a step for stabilising the isomerisation effluent before sending it to the molecular sieve adsorption step however, such techniques are complex and one of its disadvantages is that it is a batch process. For this reason, catalytic systems which are of lower performance have been used, based on zeolite and not using chlorine. This results in a product with an octane number which is lower by 1 to 2 points to that which would have been obtained with a catalyst based on chlorinated alumina. The laws of thermodynamics dictate that the lower the temperature, the higher the conversion of n-paraffins to isoparaffins and further, the better the conversion of $C_6$ isomers with low octane number (methylpentanes) to $C_6$ isomers with a higher octane number (dimethylbutanes).

In addition, "conventional" layouts must be considered which use separation columns (deisopentaniser and deisohexaniser), since separation columns can be protected from chlorine contamination. However, these layouts require a lot of equipment and consume large quantities of energy, and are thus expensive to use. A layout using a single separation column (the deisohexaniser alone) would be less expensive but could not convert all of the normal-pentane to isopentane and thus could not obtain the octane number increase obtained with recycling schemes.

Finally, U.S. Pat. No. 5,177,283, which describes the production of alkylbenzenes, mentions the possibility of associating a fractionation column which carries out distillation with a single external reaction zone for the isomerisation of $C_4$–$C_8$ paraffins, the effluent from the reaction zone being returned to the column just below the point where the feed is removed from the reaction zone.

SUMMARY OF THE INVENTION

The present invention concerns a process which can increase the octane number of a petroleum cut containing normal paraffins by as much as possible, and which in particular can overcome the disadvantages mentioned above. The process of the invention is characterized in that it does not comprise the techniques of separation by adsorption on molecular sieves and integrates the distillation and isomerisation operations which are arranged and operated so as to maximise the conversion of normal paraffins to isoparaffins.

The invention concerns a process for isomerising a feed containing essentially hydrocarbons, preferably paraffins, and more preferably the major portion being paraffins containing principally 4 to 8 carbon atoms per molecule, preferably principally 4 to 6 carbon atoms per molecule and more preferably principally 5 and/or 6 carbon atoms per molecule (i.e., selected from the group formed by paraffins containing principally 5 carbon atoms per molecule and paraffins containing principally 6 carbon atoms per molecule), in which said feed is treated in a distillation zone comprising an exhausting zone and a rectification zone, associated with an isomerisation reaction zone, in the presence of an isomerisation catalyst and a gas stream containing hydrogen, preferably as the major portion, characterized in that the reaction zone is at least partially internal to the distillation zone.

The feed in the reaction zone is drawn off at a draw-off level and represents at least a portion, preferably the major portion, of the liquid flowing in the distillation zone, at least a portion and preferably the major portion of the effluent from the reaction zone being reintroduced into the distillation zone to ensure continuity of distillation.

The feed supplying the process of the invention is from any source known to the skilled person, for example a light naphtha cut from a naphtha fractionation unit or a light reformate, preferably substantially free of benzene, and more preferably substantially free of benzene, any other unsaturated compound containing at most six carbon atoms per molecule, and optionally any other compound such as cyclohexane or any isoparaffin containing seven carbon atoms per molecule.

The feed supplied to the distillation zone is generally introduced into the zone to at least one level of said zone, preferably principally to a single level in said zone.

The distillation zone which carries out fractionation by continuous distillation as is known to the skilled person, generally comprises at least one column provided with at least one distillation device selected from the group formed by plates, loose packing and structured packing, as is known to the skilled person, such that the global overall efficiency is at least five theoretical plates. In cases which are known to the skilled person where the use of a single column causes problems, it is generally preferable to divide the zone and use at least two columns which, placed end to end, form said zone, i.e., the rectification zone, the portion of the reaction zone which is internal to the distillation zone and the exhausting zone are distributed over the columns. In practice, the rectification zone or the exhausting zone, preferably the exhausting zone, is generally in at least one column which is different from the column comprising the internal portion of the reaction zone.

The isomerisation reaction zone generally comprises at least one catalytic isomerisation bed, preferably 1 to 4 catalytic bed(s); when at least two catalytic beds are incorporated into the distillation zone, these two beds can optionally be separated by at least one distillation device.

For the portion of the reaction zone which is internal to the reaction zone, the liquid can be drawn off naturally by flow in the portion of the reaction zone which is internal to the distillation zone, and reintroduction of the liquid to the distillation zone can also occur naturally by flow of the liquid from the reaction zone which is internal to the distillation zone. Further, the process of the invention is preferably such that the flow of the liquid to be isomerised is cocurrent with the flow of the gas stream containing hydrogen for each catalytic bed in the internal portion of the isomerisation zone, and more preferably is such that the flow of liquid to be isomerised is co-current with the flow of the gas stream containing hydrogen and such that the vapour in the column is separated from said liquid for each catalytic bed in the internal portion of the isomerisation zone.

In one implementation of the process of the invention, the reaction zone is completely internal to the distillation zone.

In another implementation of the process of the invention, the process of the invention is such that the isomerisation zone is both partially internal to the distillation zone and partially external to the distillation zone. In such an implementation, the isomerisation zone comprises at least two catalytic beds, at least one catalytic bed being internal to the distillation zone, and at least one other catalytic bed being outside the distillation zone. In a preferred variation of said implementation of the process of the invention, the liquid to be isomerised circulates first in the external portion of the isomerisation zone then in the internal portion of said zone. Preferably, each catalytic bed in the external portion of the isomerisation zone receives effluent from a single draw-off level. Thus the effluent from one catalytic bed in the external portion of the isomerisation zone is generally reintroduced in close proximity to a draw-off level (i.e., below, above or at the same height), preferably the draw-off level which has supplied said catalytic bed, or optionally in close proximity to the feed injection level if the draw-off level is close to the level at which the feed is injected.

In general, in said implementation of the process of the invention, the process of the invention comprises 1 to 4 draw-off level(s) which supply the external portion of the isomerisation zone. Two cases are possible. In the first case, the external portion of the isomerisation zone is supplied by a single draw-off level and thus, if said portion comprises at least two catalytic beds in at least two reactors, the reactors are disposed in series or in parallel. In the second case, the external portion of the isomerisation zone is supplied by at least two draw-off levels. Thus a portion of the external portion of the isomerisation zone which is supplied by a given draw-off level, preferably associated with a single reintroduction level, generally comprises at least one reactor, preferably a single reactor. If said portion of the external portion comprises at least two catalytic beds in at least two reactors, said reactors are disposed in series or in parallel.

In another implementation of the invention, which may or may not be independent of the preceding implementations, the process of the invention is such that the flow of the liquid to be isomerised is co-current or counter-current, preferably co-current, to the flow of the gas stream containing hydrogen, for each catalytic bed in the isomerisation zone.

Generally and preferably, the operating conditions are carefully selected as a function of the nature of the feed and other parameters which are known to the reactive distillation specialist, such as the distillate/feed ratio and the reboil ratio in the exhausting zone. Thus a gas stream containing hydrogen is generally recycled to the distillation zone as described above, to maintain a partial pressure of hydrogen in the distillation zone which is sufficient to optimise retention of the isomerisation catalyst activity. The recycled hydrogen can originate either from any external source which is known to the skilled person or from recycling a fraction of the overhead effluent from the distillation zone. The hydrogen used in the process of the invention in recycling, originating from any external source which is known to the skilled person, can originate from any source producing hydrogen of at least 50% purity by volume, preferably at least 80% purity by volume and more preferably at least 90% purity by volume. As an example, hydrogen from catalytic reforming processes, methanation, PSA (pressure swing adsorption), electrochemical generation or steam cracking can be used. In one of the preferred implementations of the process of the invention, a fraction of the hydrogen contained in the overhead effluent from the distillation zone is recovered, then compressed and used again in the distillation zone. In another implementation of the process of the invention, a fraction of the hydrogen contained in the overhead effluent from the distillation zone is recovered, then injected upstream of the compression stages associated with a catalytic reforming unit, mixed with hydrogen from said unit, said unit preferably operating at low pressure, i.e., generally at a pressure of less than 8 bar (1 bar=$10^5$ Pa).

The isomerisation catalyst is disposed in the portion internal to the distillation zone using different techniques which have been proposed for catalytic distillation. These techniques were developed principally for etherification reactions which require contact between the reactants in a homogeneous liquid phase and the solid catalyst. They are essentially of two types.

In the first type, the reaction and the distillation proceed simultaneously in the same physical space as taught, for example, in patent application WO-A-90/02603, and in patents U.S. Pat. Nos. 4,471,154, 4,475,005, 4,215,011, 4,307,254, 4,336,407, 4,439,350, 5,189,001, 5,266,546, 5,073,236, 5,215,011, 5,275,790, 5,338,517, 5,308,592, 5,236,663, 5,338,518 and EP-B1-0 008 860, EP-B1-0 448 884, EP-B1-0 396 650 and EP-B1-0 494 550 and patent application EP-A1-0 559 511. The catalyst is generally in contact with a descending liquid phase generated by the reflux introduced to the head of the distillation zone and with an ascending vapour phase generated by the reboil vapour introduced to the bottom of the zone. In this type of technique, the gas stream comprising the hydrogen required for the reaction zone for carrying out the process of the invention could be added to the vapour phase approximately at the inlet to at least one catalytic bed of the reaction zone.

In the second type of technique, the catalyst is disposed such that the reaction and distillation proceed generally independently and consecutively as taught in U.S. Pat. Nos. 4,847,430, 5,130,102 and 5,368,691, the distillation vapour in practice not traversing any catalytic bed of the reaction zone. Thus if this type of technique is used, the process of the invention is generally such that the flow of the liquid to be isomerised is in a co-current with the flow of the gas stream containing hydrogen and such that the distillation vapour is in practice not in contact with the catalyst (meaning that in practice, said vapour is separated from the liquid to be isomerised) for each catalytic bed in the internal portion of the isomerisation zone. Such systems generally comprise at least one means for introducing liquid which may, for example, be a liquid distributor, to each catalytic bed of the reaction zone, generally located below said bed. Nevertheless, since these techniques were designed for catalytic reactions between liquid reactants, they are not suitable without modification for a catalytic isomerisation reaction in which hydrogen is used in its gaseous state. For each catalytic bed in the internal portion of the isomerisation zone, it is thus generally necessary to add a means for introducing a gas stream containing hydrogen. Thus the distillation zone generally comprises at least one liquid distribution means, generally located below the catalytic bed, and at least one means for introducing a gas stream containing hydrogen, generally located below or in the catalytic bed for each catalytic bed in the isomerisation zone which is internal to the distillation zone. In one technique, the means for introducing a gas stream to each catalytic bed is identical to the means for distributing liquid in the catalytic bed, i.e., a means for introducing gas into the liquid is located upstream of the liquid distribution means (with respect to the direction of circulation of the liquid). In practice, this injects gas into the liquid upstream of the liquid distribution means. In another technique, the means for introducing a gas stream is located substantially at the level of the liquid distribution means, the gas and the liquid being separately introduced into the catalytic bed. In this other technique, the gas stream introduction means is located below or in the catalytic bed, preferably close to the liquid distribution means.

In a preferred implementation of the process of the invention, the catalyst in the internal portion of the isomerisation zone is disposed in the reaction zone in accordance with the basic apparatus described in U.S. Pat. No. 5,368, 691, arranged such that each catalytic bed in the internal portion of the isomerisation zone is supplied with a gas stream containing hydrogen, regularly distributed at its base, for example using one of the techniques described above. Using this technique, if the distillation zone comprises a single column and if the isomerisation zone is completely inside said column, the catalyst in each catalytic bed internal to the distillation zone is then in contact with an ascending liquid phase generated by the reflux introduced to the top of the distillation column and with the gas stream containing hydrogen which circulates in the same direction as the liquid, contact with the vapour phase from the distillation being prevented by passing the latter via a specially arranged chimney.

The operating conditions of the portion of the isomerisation zone which is internal to the distillation zone are a function of the operating conditions for distillation. Distillation is carried out under a pressure which is generally in the range 2 to 20 bars, preferably in the range 4 to 10 bars (1 bar=$10^5$ Pa). The temperature at the head of the distillation zone is generally in the range 40° C. to 180° C. and the temperature at the bottom of the distillation zone is generally in the range 100° C. to 280° C. The isomerisation reaction is carried out under conditions which are most generally intermediate between those established at the head and bottom of the distillation zone, at a temperature which is in the range 70° C. to 200° C., preferably in the range 100° C. to 160° C., and at a pressure which is in the range 2 to 20 bars, preferably in the range 4 to 10 bars. The liquid which is isomerised is supplied by a gas stream containing hydrogen at a flow rate which is such that the molar ratio of hydrogen to hydrocarbons (generally at the inlet to the internal portion of the reaction zone) is generally in the range 0.01 to 0.8, preferably in the range 0.06 to 0.5.

When the isomerisation zone is partially external to the distillation column, the catalyst in the external portion is disposed using any technique known to the skilled person, under operating conditions (temperature, pressure . . . ), which may or may not be independent, preferably independent, of the operating conditions of the distillation zone.

In the portion of the isomerisation zone which is external to the distillation zone, if it exists, the operating conditions are generally as follows. The pressure required for this isomerisation step is generally in the range 1 to 60 bars absolute, preferably in the range 2 to 50 bars and more preferably in the range 5 to 35 bars. The operating temperature of the external portion of the isomerisation zone is generally in the range 80° C. to 400° C., preferably in the range 100° C. to 350° C. and more preferably in the range 120° C. to 320° C. The space velocity in said external portion, calculated with respect to the catalyst, is generally in the range 0.5 to 50, more particularly in the range 1 to 30 $h^{-1}$ (volume of feed per volume of catalyst per hour). The flow rate of the gas stream containing hydrogen supplying the external portion of the isomerisation zone is such that the molar ratio of hydrogen to hydrocarbons (generally at the inlet to the external portion of the reaction zone) is generally in the range 0.01 to 0.8, preferably in the range 0.06 to 0.5. However, the scope of the invention includes the temperature and pressure conditions being in the range of those established at the head and bottom of the distillation zone.

When the operating conditions in the distillation zone and the reaction zone are correctly selected, the process of the present invention can convert more than 80% of the n-pentane in the feed to isopentane, possibly more than 90%.

Examples of catalysts which can be used in any catalytic bed of the internal portion of the isomerisation zone in the process of the invention are high activity catalysts, such as a catalyst based on a halogenated alumina, preferably a chlorinated alumina. Such catalysts are generally constituted by a support of high purity eta and/or gamma alumina (for example a mixture of eta alumina (85% to 95% by weight with respect to the support) and gamma alumina (the complement by weight) or the alumina can be constituted by 100% gamma alumina), generally comprising 2% to 10% by weight of chlorine, 0.1% to 0.35% by weight of platinum and optionally other metals. They can be used with a space velocity of 0.5 to 10 $h^{-1}$, preferably 1 to 4 $h^{-1}$. Maintaining the degree of halogenation, preferably chlorination, of the catalyst generally necessitates continuous addition of a halogenated compound, preferably a chlorinated compound such as carbon tetrachloride or perchloroethylene, injected as a mixture with the feed at a concentration of 50 to 1000 parts per million by weight. Any other catalyst could be used to carry out isomerisation under the distillation operating conditions, however, using the process of the present invention.

Thus of the catalysts which can be used in each catalytic bed of the optional external portion of the isomerisation zone, any catalyst can be used which is known to the skilled person for carrying out this reaction such as the three types of catalysts cited in the first section of the present description. Non limiting examples are catalysts based on alumina, i.e., catalysts in which the support principally comprises an alumina, generally a halogenated alumina, preferably a chlorinated alumina, the alumina being, for example, a mixture of eta alumina (85% to 95% by weight with respect to the support) and gamma alumina (the complement by weight), or the alumina can be constituted by 100% gamma alumina. Zeolite based catalysts can also be used, i.e., catalysts in which the support principally comprises at least one zeolite which can optionally be modified using any particular treatment which is known to the skilled person, preferably selected from the group formed by zeolites with the structural type mordenite, preferably mordenite, and zeolites with the structural type mazzite, preferably omega zeolite; however, as is known to the skilled person, these catalysts are generally not suitable for the isomerisation of hydrocarbons, preferably paraffins, containing essentially 4 carbon atoms per molecule. The catalysts, for example those cited above, whether alumina or zeolite based, generally comprise at least one metal from group VIII of the periodic classification of the elements, preferably selected from the group formed by nickel, platinum and palladium.

BRIEF DESCRIPTION OF DRAWINGS

The accompanying

DETAILED DESCRIPTION OF DRAWINGS

The feed to be treated containing a mixture comprising normal paraffins and isoparaffins containing 5 and 6 carbon atoms per molecule is introduced into the column via line (1). The column is constituted by separation zones C1, C2, PT1 and PT2 and reaction cells R1, R2 and R3, through which the vapour preferably circulates such that said vapour does not come into contact with the catalyst. An effluent which is rich in isopentane is extracted overhead via line (2) and an effluent containing essentially compounds of the feed other than n-pentane and isopentane is extracted from the bottom of the column via line (3). Lines (4), (5) and (6) represent addition of hydrogen to the inlet to reaction cells R1, R2 and R3.

Figure 1:
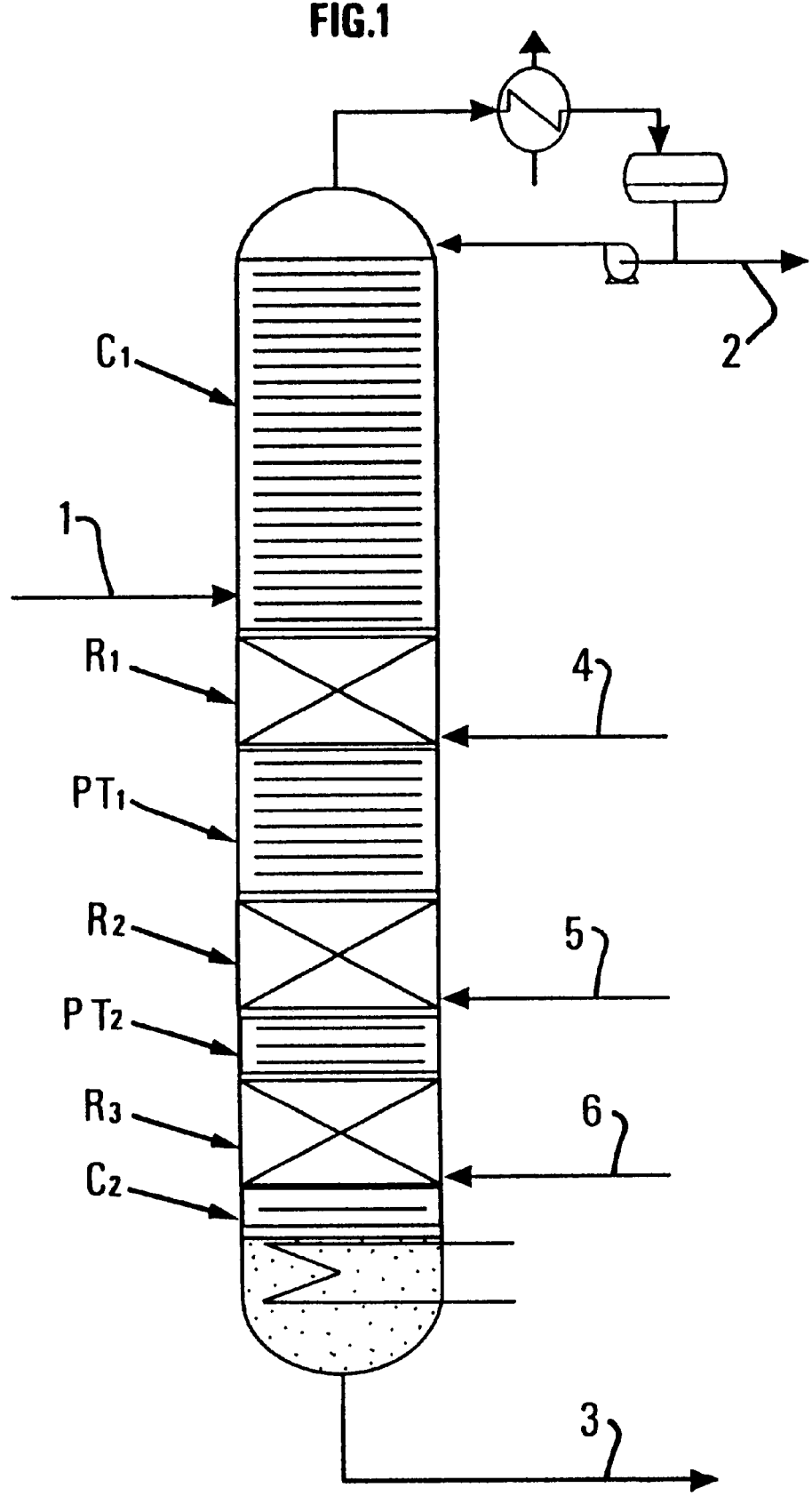
FIGS. 1 and 2 illustrate the invention, more precisely two preferred implementations of the process of the invention, without limiting the scope thereof.

FIG. 1 shows an implementation of the process in which the reaction zone is completely integrated in the column. This reaction zone comprises elements R1, PT1, R2, PT2 and R3.

Figure 2:
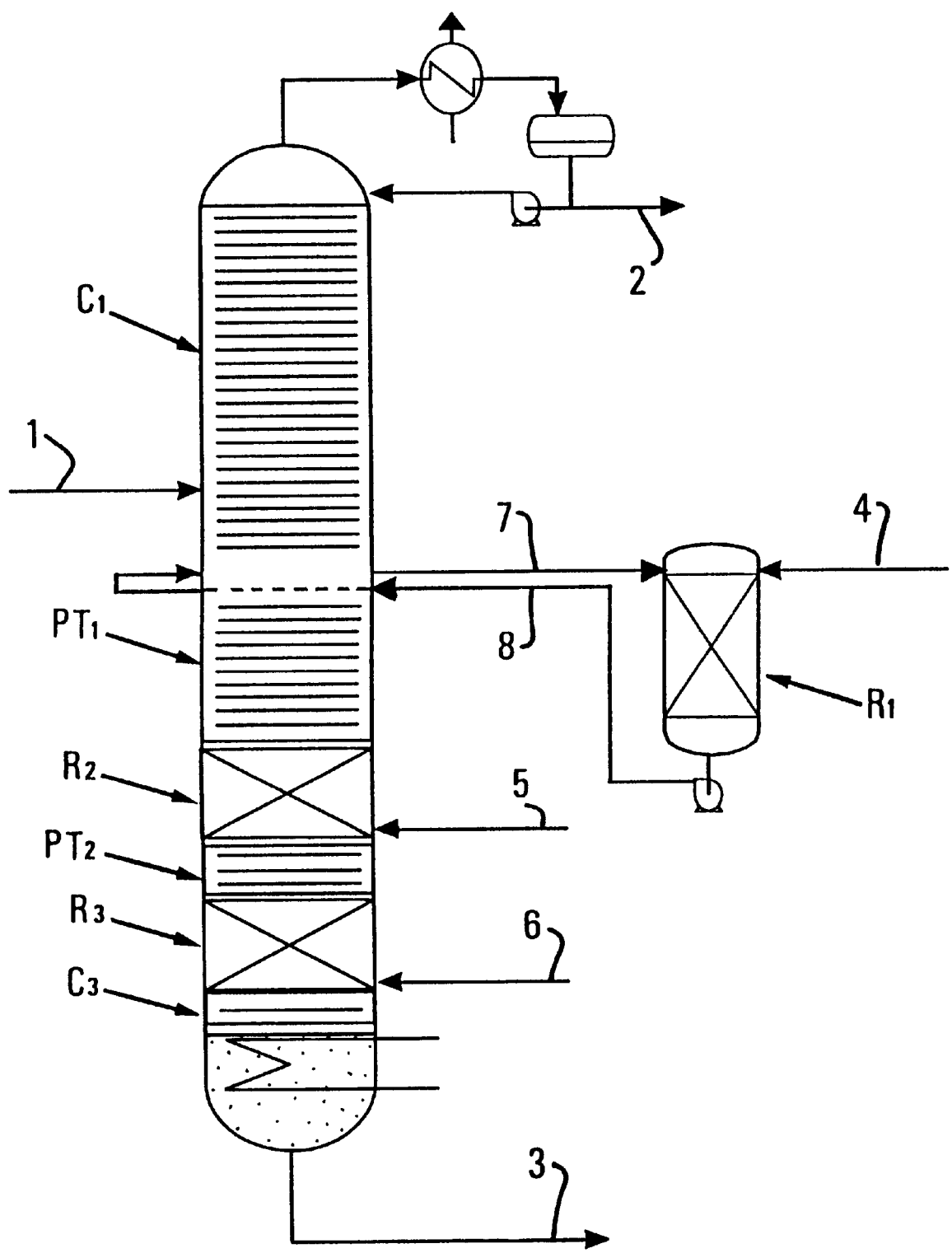

FIG. 2 shows an implementation of the process in which the reaction zone is partially external to the column. The liquid from distillation zone C1 is drawn off via line (7) which takes the liquid to reaction cell R1. The liquid leaving reaction cell R1 is directed to the top of distillation zone PT1 via line (8).

The following examples illustrate the invention without limiting its scope. Calculations were carried out using PROII version 3.3 software from Simulation Sciences Inc. Liquid-vapour equilibria were represented by the Peng-Robinson equation of state. The solubility of hydrogen in hydrocarbons was calculated using a Henry coefficient. The catalyst type was selected following studies on a pilot fixed bed isomerisation unit.

EXAMPLE 1 (in accordance with the invention):
Example Calculated Using the Layout of FIG. 1

The feed was constituted by a light naphtha with the following composition by weight:

| | |
|---|---|
| isopentane | 24.6 |
| normal-pentane | 27.8 |
| 2,2-dimethylbutane | 1.7 |
| 2,3-dimethylbutane | 2.8 |
| 2-methylpentane | 15.0 |
| 3-methylpentane | 8.5 |
| normal-hexane | 13.2 |
| methylcyclopentane | 3.6 |
| cyclohexane | 1.5 |
| $C_7^+$ | 1.3 |

This feed had a research octane number (RON) of 71.2 and a motor octane number (MON) of 70.7. It was supplied to a reactive distillation column at a rate of 93.6 kg/h. The column had 38 theoretical plates and operated at an overhead pressure of 7.5 bar, an overhead temperature of 99° C. and a bottom temperature of 142° C. The feed was introduced to the 27$^{th}$ plate (plate no. 1 was the condenser, plate no. 38 was the reboiler). Three reactive zones were used in this implementation through which the vapour circulated such that the vapour did not come into contact with the catalyst. They were interposed between, respectively, theoretical plates 28 and 29, 33 and 34, and 36 and 37. The catalyst contained 0.3% of platinum and 8% of chlorine on alumina constituted by 90% of eta alumina and 10% of gamma alumina. The hydrogen/hydrocarbons molar ratio at the reactor inlet was 0.1.

41.9 kg/h of a liquid distillate which was rich in isopentane and contained about 3 mole % of normal-pentane was extracted overhead and 50.2 kg/h of a liquid effluent containing 12 mole % of isopentane and 3 mole % of normal-pentane was extracted from the bottom, the remainder being constituted by compounds in the feed containing 6 carbon atoms per molecule. The normal-pentane conversion rate was thus 82.8%. The octane number of the reconstituted cut after mixing the distillate and the residue had increased by 7 points (the RON was 78.6 and the MON was 77.2).

EXAMPLE 2 (in accordance with the invention):
Example Calculated Using the Layout of FIG. 1

The feed was identical to that used in Example 1. It had a research octane number (RON) of 71.2 and a motor octane number (MON) of 70.7. It was supplied to a reactive distillation column at a rate of 93.6 kg/h. The column was the same as that described in Example 1. It operated at an overhead pressure of 7.5 bar, an overhead temperature of 99° C. and a bottom temperature of 142° C. The catalyst contained 0.3% of platinum and 6.5% of chlorine on alumina constituted by 100% of gamma alumina. The hydrogen/hydrocarbons molar ratio at the reactor inlet was 0.1.

41.9 kg/h of a liquid distillate which was rich in isopentane and contained about 3 mole % of normal-pentane was extracted overhead and 50.2 kg/h of a liquid effluent containing 12 mole % of isopentane and 3 mole % of normal-pentane was extracted from the bottom, the remainder being constituted by compounds in the feed containing 6 carbon atoms per molecule. The normal-pentane conversion rate was thus 82.7%. The octane number of the reconstituted cut after mixing the distillate and the residue had increased by about 7 points (the RON was 78.5 and the MON was 77.0).

EXAMPLE 3 (in accordance with the invention):
Example Calculated Using the Layout of FIG. 2

The feed was identical to that used in Example 1. It had a research octane number (RON) of 71.2 and a motor octane number (MON) of 70.7. It was supplied to a reactive distillation column at a rate of 93.6 kg/h. The column had 55 theoretical plates and operated at an overhead pressure of 7.5 bar, an overhead temperature of 98° C. and a bottom temperature of 140° C. The feed was introduced to the $27^{th}$ plate (plate no. 1 was the condenser, plate no 55 was the reboiler). Three reactive cells were used in this implementation through which the vapour circulated such that the vapour did not in practice come into contact with the catalyst. They were interposed between, respectively, theoretical plates 38 and 39, 48 and 49, and 53 and 54. The hydrogen/hydrocarbons molar ratio at the reactor inlet was 0.1.

46.7 kg/h of a liquid distillate which was rich in isopentane and contained about 8 mole % of normal-pentane was extracted overhead and 46.7 kg/h of a liquid effluent containing 6 mole % of isopentane and 1 mole % of normal-pentane was extracted from the bottom, the remainder being constituted by compounds in the feed containing 6 carbon atoms per molecule. The normal-pentane conversion rate was thus 90%. The octane number of the reconstituted cut after mixing the distillate and the residue had increased by about 8 points (the RON was 79.1 and the MON was 77.6).

We claim:

1. A process for isomerising a feed containing essentially hydrocarbons containing principally 4 to 8 carbon atoms per molecule, comprising passing said feed to a distillation zone comprising an exhausting zone and a rectification zone, associated with an isomerisation reaction zone containing at least one catalytic bed, and in said reaction zone, isomerising a liquid from said distillation zone in the presence of an isomerisation catalyst and a gas stream containing hydrogen, wherein the reaction zone is at least partially internal to the distillation zone and further comprising distributing said gas stream containing hydrogen into the bottom of said at least one catalytic bed through a dedicated gas distributor, and conducting said distillation so that distillation vapor does not come into contact with the catalyst in the reaction zone at least partially internal to the distillation zone.

2. A process according to claim 1, in which distillation is carried out at a pressure which is in the range 2 to 20 bars, the overhead temperature in the distillation zone being in the range 40° C. to 180° C. and the temperature at the bottom of the distillation zone being in the range 100° C. to 280° C.

3. A process according to claim 1, in which the reaction zone is completely internal to the distillation zone.

4. A process according to claim 1, in which the reaction zone is both partially incorporated into the rectification zone of the distillation zone and partially external to the distillation zone.

5. A process according to claim 4 in which, for the portion of the isomerisation zone which is external to the distillation zone, the isomerisation reaction is carried out at a temperature which is in the range 80° C. to 400° C., at a pressure which is in the range 1 to 60 bars, the space velocity in the external portion of the isomerisation zone, calculated with respect to the catalyst, is generally in the range 0.5 to 50 h$^{-1}$ (volume of feed per volume of catalyst per hour) and the flow rate of the gas stream containing hydrogen supplied to the external portion of the isomerisation zone is such that the hydrogen/hydrocarbons molar ratio is in the range 0.01 to 0.8.

6. A process according to claim 1 in which, for the portion of the isomerisation zone which is internal to the distillation zone, the pressure required for this isomerisation step is in the range 1 to 60 bars, the temperature is in the range 100° C. to 400° C., and the flow rate of the gas stream containing hydrogen supplied to the internal portion of the isomerisation zone is such that the hydrogen/hydrocarbons molar ratio is in the range 0.01 to 0.8.

7. A process according to claim 1, in which the flow of liquid to be isomerised is a co-current with the flow of the gas stream containing hydrogen in each catalytic bed in the internal portion of the isomerisation zone.

8. A process according to claim 1, in which the isomerization zone comprises at least one means for distributing liquid in each catalytic bed of said zone.

9. A process according to claim 8 in which, for each catalytic bed in the internal portion of the reaction zone, the liquid is distributed by a liquid distribution means located below the catalytic bed and the gas stream is introduced by a means for introducing a gas stream located below or in the catalytic bed.

10. A process according to claim 1 comprising a plurality of catalytic beds in the internal portion of the reaction zone, and the hydrogen-containing gas stream is introduced by a dedicated gas distributor into each of said catalytic beds.

11. A process according to claim 8, in which the gas stream is introduced into the catalytic bed by a means for introducing a gas stream, the liquid is distributed in the catalytic bed by a distributing liquid, the means for gas distributor being disposed substantially at the level of the liquid distribution means, the gas and the liquid being introduced separately into the catalytic bed.

12. A process according to claim 1, in which the catalyst used in the isomerisation zone comprises at least one metal selected from the group formed by elements from group VIII of the periodic classification of the elements and a support.

13. A process according to claim 12, in which said support is based on alumina.

14. A process according to claim 12, in which said support is based on zeolite.

15. A process according to claim 14, in which said zeolite is selected from the group formed by zeolites of structural type mordenite and zeolites of structural type mazzite.

16. A process according to claim 1, in which a fraction of the hydrogen comprised in an overhead effluent from the distillation zone is recovered then compressed and re-used in said distillation zone.

17. A process according to claims 1, in which the feed comprises essentially paraffins.

18. A process for isomerising a feed containing essentially hydrocarbons containing principally 4 to 8 carbon atoms per molecule, comprising passing said feed to a distillation zone comprising an exhausting zone and a rectification zone, associated with an isomerisation reaction zone containing at least one catalytic bed, and, in said reaction zone, isomerising a liquid from said distillation zone in the presence of an isomerisation catalyst and a gas stream containing hydrogen, wherein the reaction zone is at least partially internal to the distillation zone and further comprising distributing said gas stream containing hydrogen into the bottom of said at least one catalytic bed through a dedicated gas distributor.

19. A process for isomerising a feed containing essentially hydrocarbons containing principally 4 to 8 carbon atoms per molecule, comprising passing said feed to a distillation zone comprising an exhausting zone and a rectification zone, associated with an isomerisation reaction zone containing at least one catalytic bed, and, in said reaction zone, isomerising a liquid from said distillation zone in the presence of an isomerisation catalyst and a gas stream containing hydrogen, wherein the reaction zone comprises at least one external reaction zone outside of the distillation zone, wherein distillation vapor does not contact the catalyst in said external reaction zone, and wherein gas stream hydrogen is passed into said external reaction zone through a dedicated gas distributor; and wherein the distillation zone further comprises at least one internal reaction zone in the interior of said distillation zone.

* * * * *